(12) United States Patent
Shick

(10) Patent No.: US 6,688,105 B1
(45) Date of Patent: Feb. 10, 2004

(54) ICEBERG UTILIZATION PROCESS IMPROVEMENT

(76) Inventor: Jack N. Shick, 2998 Eamans Loop, Harrisonburg, VA (US) 22802

( * ) Notice: Subject to any disclaimer, the term of this patent is extended or adjusted under 35 U.S.C. 154(b) by 532 days.

(21) Appl. No.: 09/672,873

(22) Filed: Sep. 29, 2000

(51) Int. Cl.⁷ .................................................. F03G 6/00
(52) U.S. Cl. ............................ 60/641.1; 405/52; 405/61
(58) Field of Search .......................... 60/641.1; 405/52, 405/61, 63, 66, 72, 211

(56) References Cited

U.S. PATENT DOCUMENTS

| | | | |
|---|---|---|---|
| 3,289,415 A | * 12/1966 | Merrill | |
| 4,172,751 A | * 10/1979 | Mougin | 156/324 |
| 4,191,491 A | * 3/1980 | Mougin | 405/52 |
| 4,289,423 A | * 9/1981 | Mougin | 405/61 |
| 4,299,184 A | * 11/1981 | Mougin | 114/253 |

* cited by examiner

*Primary Examiner*—Hoang Nguyen

(57) ABSTRACT

Improvements to a process for moving icebergs from Antartica to arid destinations wherein the iceberg is thermally insulated on bottom and sides with kelp grown into mats, pushed with a subtug below sea level to direct its force vector throught the iceberg's center of gravity, stopped at a destination site by pawls extending from bedrock at the bottom of a channel which has multiple rolldams made of rollable round discs which can open the channel to allow passage of the iceberg and close the channel to contain melt water.

9 Claims, 12 Drawing Sheets

ICEBERG UTILIZATION PROCESS IMPROVEMENT

To a recent World Bank report $600 billion will be spent over the next decade to augment water reserves. In those areas that now rely on desalination methods for generating fresh water, people look for more abundant and less costly sources.

In exploring the earth's water resources, one can not find a more abundant source than in polar ice, which stores approximately 80% of the entire planet's fresh water. Harvesting and transporting this water to prepared ports, in the form of naturally occurring icebergs, would make monumental changes. Desert and arid climates could become agricultural centers with abundant irrigation. Densely populated regions, which now struggle with pollution, would be able to overcome poverty and disease. Industries would have lower costs because of more available resources. People would not need to compete for scarce resources when ample supplies are provided, thereby reducing the possibility of confrontations and war.

With these potential benefits in view, an International Conference and Workshop on Iceberg Utilization was convened. It was held at Iowa State University in 1977 and was attended by the world's foremost experts on iceberg utilization and other related disciplines. A book entitled "Iceberg Utilization," edited by A. A. Husseiny, provides the details of the conference, and states that its objectives, among others, are examining the feasibility of iceberg utilization and providing reference material for the same. Within it there is much detail on the various aspects of global iceberg utilization, including iceberg selection, harvesting, insulation, transport, storage, and the final distribution and consumption of its fresh melt water.

Each one of these aspects present tremendous and unique challenges that must be overcome in order to be feasible and successful. The prior art in this field, however, while introducing some interesting and innovative approaches, unfortunately has not yet sufficiently met these challenges, as will be shown below.

First the iceberg must be chosen. Data on the size, shape, and distribution of tabular icebergs appears on page 55 of the above-mentioned book. Tabular icebergs are preferred for transport because their flat surfaces have less drag through the water and a rectangular cross section would help avoid rolling or calving during transport. Additionally, transport would be aided if the iceberg had a large length to width ratio. The Antarctic has the greatest selection of tabular icebergs, and more particularly the Ross and Amery ice shelves produce a large number of ideal tabular icebergs. The iceberg will be chosen based on an optimal shape, size, and location for transport and storage.

In order to convey it to the Northern hemisphere, the iceberg must be protected from warm waters. "If icebergs towed across tropical areas are unprotected, the water losses due to ablation could make their use uneconomical. Hence, it is imperative to protect towed icebergs from ablation throughout their trip by incorporating adequate insulation to minimize heat transfer," wrote Syed N. Hussain, on page 423 of the above-referenced book. The use of an insulator and protector under the iceberg and along its sides up to and above the waterline would be the best way to ensure that an economically feasible sized iceberg's arrival at its terminal port. This is because the greatest causes, by far, for iceberg melting, calving, and spalling during transport would be due to the warmer water surrounding the lower five-sixths the iceberg and the ocean's wave action in the area of its waterline.

In view of this, several patents have dealt with both or either of these two problems. The methods and apparatuses disclosed in U.S. Pat. No. 4,172,751 (1979), U.S. Pat. No. 4,175,887 (1979), U.S. Pat. No. 4,193,712 (1980), U.S. Pat. No. 4,200,409 (1980), U.S. Pat. No. 4,230,418 (1980), U.S. Pat. No. 4,258,640 (1981), and U.S. Pat. No. 4,289,423 (1981), all to Mougin, and in U.S. Pat. No. 3,289,415 (1966) to Merrill all present the same general flaws. Firstly, the apparatuses themselves add a level of complexity far above what is necessary to insulate and protect an iceberg. Secondly, they would be extremely expensive to manufacture. Specialized factories would have to be built to produce and handle the over 800,000 square yards of petroleum-based or other material and items needed to cover just the sides of one iceberg alone. Thirdly, problems arise in handling and transporting these immense apparatuses not only from the factory to the ocean, but also over water to the iceberg preparation sites. Fourthly, the apparatuses are composed of non-recyclable components and so present problems relating to further transport from or ultimate disposal at the final destination site. Lastly, and perhaps most significantly, all of the above-cited patents, excepting U.S. Pat. No. 3,289,415, do not insulate the bottom of the iceberg. This means that nearly two-thirds of the total area of the iceberg which is exposed to the surrounding warm water is neglected, which will dramatically increase melting and ablation. Thus, precious and costly fresh water, measuring in the billions of gallons, will be wasted en route to where it is needed the most.

In addition to their general flaws, some of the above-cited patents have particular shortcomings as well. U.S. Pat. Nos. 4,172,751 and 4,230,418 both rely on a wall of chilled water to insulate the iceberg. In practice, because the chilled water is not contained, it will simply sink and be replaced by the surrounding warm water. U.S. Pat. No. 4,193,712 has ballast tanks which will drag against the insulating sheath and wall and thus damage them. Also, the entire insulating wall is supported on weak ice. U.S. Pat. No. 4,200,409 has many joints and thus much leakage, and the flexing of the wall from wave action will agitate the water surrounding the iceberg. Also, it is supported by gantries located in the soft ice on top of the iceberg which is not adequately strong and stable. U.S. Pat. No. 4,258,640 adds sixty meters to the width of the iceberg. This prevents any streamlining of the iceberg's shape and adds a very substantial frictional surface area during transport, which greatly increases energy costs. U.S. Pat. No. 4,289,423 uses helicopter platforms which do not conform to the specifications of the Aeronautics Safety Board. U.S. Pat. No. 3,289,415 is meant for icebergs a small fraction of the size dealt with here.

U.S. Pat. No. 4,191,491 (1980) to Mougin discloses a method for reducing the rate at which solar radiation melts the freeboard of the iceberg. Though the method itself is highly questionable and surely unsafe, the entire undertaking is quite unnecessary and not remunerative. "Kollmeyer has investigated in detail the melting of icebergs and has estimated that the heat transferred by radiation is about $\frac{1}{500}^{th}$ of that by conduction and convection through contact with the sea water," wrote Syed N. Hussain on page 424 in the above-mentioned book.

To move a large iceberg thousands of miles for up to six months at sea, an improved system of propulsion must be developed. A system, outlined by C. Peter Benedict on pages 334–338, exists for towing relatively small icebergs short distances. However, the system cannot be applied to these far larger icebergs over greater distances. Similany, U.S. Pat. No. 4,621,946 (1986) to Page, is intended for relatively small icebergs which must only be towed out of shipping lanes. U.S. Pat. No. 4,299,184 (1981) to Mougin and U.S. Pat. No. 3,931,715 (1976) to Fitch et al. both also require towing with cables. In particular U.S. Pat. No. 3,931,715 is extremely ill-suited for long distances.

Towing a massive iceberg with cables cannot work for a number of reasons. Firstly, the cables could not be easily set at a point below sea level where force would be best applied to the mass. Accelerating force vectors should be applied to act directly through the center of gravity of the iceberg to avoid rolling or canting. To render matters still more difficult, the center of gravity changes constantly as the mass of the iceberg inevitably decreases during transport. Secondly, the narrow area of a cable or even of a net of cables would cause high pressure at the point of contact, thereby melting through the ice instead of towing it. Moreover, it is not possible to hold the larger iceberg together if cables are used. Icebergs are not solid masses, but a number of joined parts frozen together along fractures. The iceberg would soon calve under the applied forces of a towing cable. Thirdly, steering such a mass is a challenging prospect, and it is more so if towed by several ships needing to constantly move together and not apply shear stresses on the fragile ice. Finally, a huge tug boat, or battery of tug boats, totaling in excess of 90,000 shaft horsepower would be required to move such massive objects. The reverse wake effect from this powerful arrangement would cause the iceberg to spall and eventually disintegrate.

Other methods disclosed in the prior art, which do away with the problems inherent in both cables and towing, present other problems. Mamo, in U.S. Pat. No. 4,320,989 (1982), fails to account for the frailty of the ice. Bursting bubbles cause cavitation of steel and bronze propellers. In addition, air at high pressure has increased temperature. This combination of force and heat would destroy an iceberg. Further, by having a tug boat in front of the iceberg, the wake of the boat would cause additional ablation and would also make the iceberg difficult to control.

A self propelled iceberg as disclosed in U.S. Pat. No. 4,334,873 (1982) to Connell would very likely calve under the forces. Furthermore, the structures disclosed are built on the softest and weakest area of the iceberg, the so-called "wet ice". Apart from presenting an unacceptable safety hazard to any personnel on the iceberg, when the inevitable ablation and spalling occurs near the equipment attached to the edges and sides of the iceberg, the equipment would fall off and be lost.

The device disclosed in U.S. Pat. No. 4,177,748 (1979) to Mougin has other problems associated with it. The force of propulsion being at right angles to its support members is wrong. This would tend to promote additional stress factors and almost certainly detach the propulsion units from the iceberg. Also, the position of the propulsion units on the bottom of the iceberg means that it is pushing the iceberg far below the iceberg's center of gravity thus promoting instability, rolling and loss of steering control.

While the propulsion device disclosed in U.S. Pat. No. 4,223,627 (1980) to Mougin does away with many of the aforementioned objections to the previously-cited prior art, it suffers from its own failings. Firstly, the device is embedded into the side of the iceberg. This puts it in very real danger of unintentionally disembedding itself from the iceberg due to the effects of stress- and temperature-induced ablation. Secondly, it utilizes an electrical power generation plant installed on the weak and unsafe top of the iceberg. Finally, and perhaps most importantly, the propulsion device is not designed to be repositioned. This is a serious shortcoming since the iceberg's center of gravity is constantly shifting due to iceberg mass reduction. This means that eventually the propulsion device will be substantially off center thereby causing dangerous rolling, instability, loss of steering control, and reduction in propulsion efficiency.

Once the iceberg arrives at its final destination in the given arid region, it must be stored while its fresh water is reclaimed through melting. In connection with this, U.S. Pat. No. 4,201,498 (1980) to Mougin discloses a method for rapidly melting an iceberg. While imaginative and innovative, it adds an unnecessary element and level of inefficient complexity to the melting process, through its use of electric pumps and other equipment.

SUMMARY OF THE INVENTION

I have been interested in the polar region since, as a boy scout, I applied to travel there with Admiral Byrd in the 1920's. Since that time I have visited several large dams, and sailed boats from Maine to Venezuela, Japan, Indonesia, Egypt and the Mediterranean. After a lifelong awareness of maritime functions and problem solving, it has become clear that the herein described improvements of a method of iceberg utilization make it the best system for large scale water redistribution.

Several stages and steps are involved in a procedure for properly exploiting the iceberg resource. Beginning with a detailed iceberg selection process, to the capture and harvesting of the iceberg, to intricately and thoroughly insulating it for transit in warmer waters with an environmentally beneficial covering, to providing a safe, effective, and steerable propulsion means, to calculating a route that accounts for variables including coriolis, wind, water currents and sounding depths, to stopping the iceberg within a terminal channel without damaging the channel walls, to isolating the iceberg's melt water from sea water, to the final distribution of the melt water, each stage will become an industry of its own as will be shown by example below.

The present invention solves the problems found in the prior art approaches to iceberg insulation and propulsion and introduces new solutions to iceberg stoppage, reception, and storage at its final destination. All parts of the invention combine to make a process that can allow the utilization of icebergs to abate fresh water shortages.

Once selection and harvesting of the iceberg are made, as described in detail elsewhere, the insulation must be produced, brought to the iceberg, and applied. For the application of this insulator it must be recognized that the size of the iceberg would require hundreds of tons of material. A buoyant mat such as kelp, is therefore superior to heavier materials. The kelp can be grown within a rope framework that can be harvested as kelp blankets. These blankets can be transported to the iceberg and attached without ever being lifted from the water. This saves a great deal of labor and equipment. The cost of the insulator and the equipment necessary for application are large factors in the economic success of the iceberg utilization.

Unlike the insulating methods and apparatuses used in the prior art, naturally-grown kelp blankets are produced cheaply without the need for expensive materials, manufacturing processes, or specialized factories. They provide a simple, effective barrier that is free of leaks and gaps. They do not rely on chilled water for insulation since kelp is a natural thermal insulator as can be seen by the long time that ice remains under a kelp wad on a beach. They are easily handled, transported, and applied. They are recyclable and can actually be used at the point of destination. They do not require repair, re-transportation, or final disposal. They do not have parts associated with them that may become entangled or damage the insulation. They allow for a streamlined iceberg configuration which aids transportation. They do not rely on the soft and weak ice on the top of the iceberg for support. Finally, they not only cover the sides of the iceberg, but float up to cover the huge, exposed bottom side of the iceberg as well. Moreover, the use of kelp for the production of the insulation in the present invention can actually lead to the start of a whole new industry. Setting up the kelp growing sites, tending to the kelp, growing it into kelp blankets, growing other natural fibers needed in the blanket production, are just some of the occupations that will potentially provide employment for thousands of island dwellers.

For the propulsion of the iceberg, a powerful, specially designed, remotely-operated subtug is provided. This subtug will push the iceberg at the intersection of the center of one of its shorter sides and the iceberg's center of gravity. Its front end employs a retractable ram which, because of its very large surface area, will not break the ice apart due to excessive compression forces or permanently embed itself into the iceberg's side. Thus it can be easily re-positioned on the ever-shifting center of gravity of the iceberg.

This method has tremendous advantages over the propulsion methods and apparatuses found in the prior art. It does not require the use of towing by ship or the use of cable and so does away with all the following objections. Towing with the tremendous power required will produce a correspondingly large and destructive reverse wake effect on the iceberg. The stresses associated with using two or more tugs for steering can break apart the iceberg. Cables can actually cut through the iceberg. Finally, they cannot easily be placed on the iceberg's center of gravity nor easily repositioned as necessary.

Further, this method, unlike some others in the prior art, will not disintegrate the iceberg through high air pressure and temperature, will not present a safety hazard or danger of equipment loss through contact with the soft ice on top of the iceberg but can apply its propulsion force in any direction and preferably directly through the iceberg's center of gravity. For these reasons, the method and apparatus disclosed here is far superior to any method or apparatus disclosed heretofore.

Such a large mass of ice has great momentum, and once at its final destination must be brought to a stop without crashing into any object that cannot be easily fixed or replaced. This invention provides a wide channel for the iceberg to be sent into, and movable inner and outer dams. Once in the channel, the bottom of the iceberg runs up against metal pawls, designed to stop the iceberg in the channel before reaching either the inner dam or the end of the channel. These pawls will be set into sockets in the channel, and, when struck by the incoming iceberg, will shear off ice, converting inertia into work for reducing the iceberg. The socket is designed to raise the pawl to an angle to meet the iceberg.

Next, the outer dam is rolled into place behind the iceberg, isolating it from the highly concentrated salt in ocean water. The dams are composed of one or more large discs fitted with multiple internal tanks arranged radially around the disc. An internal array of valves, pumps, and pipes allows the internal tanks to be filled with liquid or air causing the disc to roll. The individual discs can be set tight together to form a single dam by pumping the liquid inside to adjust the center of gravity. The dam in place, sea water will be less able to pollute the fresh melt water.

The inner dam can be rolled open to bring the newest iceberg into an area for containment and distribution of the fresh water. With two sets of dams, several icebergs can be stored, ready for distribution to any number of users.

The concept of damming a large channel as required by this invention is without precedent. In the Netherlands there are wide channels. However, these are relatively shallow. The dam of the present invention envisions a height in excess of 500 feet. Although seemingly a large scale venture, it is the size that makes it appealing. The quantity of water that is moved with a single iceberg makes it the most cost effective source. Much more so than the energy-dependent desalination that reclaims sea water.

In the summary of findings of the Iceberg Utilization Conference, it was understood that given proper innovation in the area of insulation during transit, and backing by world governments, water costs could be reduced by half, and iceberg utilization was a consummate notion. "There is an endless supply of icebergs and the future holds great promise for turning arid, barren lands into rich, fertile valleys." (Jerry Rosenberg on page 622).

Therefore, in view of the foregoing, the present invention is an improvement to the process of moving fresh water in the form of icebergs from their calving site in Antarctica to arid areas that have an increasing need for fresh water. Four interrelated areas of improvement to the utilization process are disclosed.

First an improved means of insulating the iceberg from warm tropical waters provides an environmentally compatible material that utilizes renewable resources available in ocean waters. Once grown and pulled into a mat, the insulation product never has to be lifted or taken from the water. All transportation costs are for towing and placement of the mats.

Second is an improved means of propelling the iceberg to its final destination through tropical waters. The propulsion unit can be placed at optimum positions on the iceberg. A large surface area in contact with the iceberg allows greater force to be applied without damage to the ice. Said propulsion unit is also used for placing the insulation mats.

Third is an improved means of bringing the iceberg to a stop at its final destination. By using a large number of pawls to shear off ice and slow momentum, damage to a few will not hinder the operation. Chipping off chunks will speed the melt process slightly. The insulating mat can be placed to shape the iceberg's bottom to be compatible with the use of the pawls.

Fourth is an improved means of storing the iceberg and melt water at its final destination. The large size of the inner canal allows multiple icebergs to be held in various stages of melt, and the brackish contamination is reduced by the two sets of roll dams. Kelp stripped from the icebergs by the pawls can also be gathered as a byproduct. The object of this invention is to provide an improvement to the process of supplying fresh water in large quantities to areas worldwide by relocating polar icebergs.

A further object is to provide an improved means of insulating the iceberg to prevent excessive melt in tropical waters.

A further object is to provide a means of making a kelp blanket to use as said insulation. A further object is to use an environmentally compatible insulation means.

A further object is to provide an improved means of propelling the iceberg.

A further object is to provide a means of propelling the iceberg without causing the iceberg to break apart.

A further object is to provide an improved means of propelling which can be controlled from one ship.

A further object is to provide a means of propelling which can be placed at an optimal spot on the surface of the iceberg.

A further object is to provide a channel in which to bring the iceberg to a stop.

A further object is to provide a means of stopping the iceberg in the channel.

A further object is to use dams which can be moved, despite large size by rolling.

A further object is to use rolling dams to reduce brackish contamination.

A further object is to use rolling dams to reduce wave action in the channel.

A further object is to provide an inner channel to store numerous icebergs and the melt water from such.

DETAILED DESCRIPTION OF THE PREFERRED EMBODIMENT

All of the following operations as dependant parts to an improved process for utilizing icebergs are seen as major, continually ongoing industries. Each will directly or indirectly involve hundreds or thousands of people and will require substantial amounts of investment capital. Each operation is dependant on the other operations for the overall feasibility of the whole improved utilization process.

Due to the enormous value of its water and its cost in processing the selection and harvesting of the appropriate iceberg for eventual insulation, transport, storage, and utilization is critical. The worldwide production of icebergs is continual and is estimated at about 1,000,000 million cubic meters per year (Weeks p. 23). However either because of inappropriate shape, size, structural integrity, or placement many of these are not economical or feasible for processing. Extensive study and research by some of the world's foremost iceberg utilization experts have resulted in guidelines for the optimal iceberg: In terms of transport it must be tabular, that is, a flat rectangular cube so that, unlike irregular icebergs, it will have a predictable center of gravity and float in a stable manner. Icebergs shaped otherwise would be nearly impossible to control and could roll over during transport thus causing a large-scale disaster. The iceberg should be no longer than 2 km or it will be prone to mechanical breakup by long wavelength swells. For transport efficiency, the ratio of the iceberg's length to width should be appreciably greater than one to one. To avoid capsizing, the ratio of the iceberg's width to thickness should be at least three to two. The iceberg should have as few crevasses and natural fault lines as possible to prevent calving or splitting. These can be observed with electronic sounding instruments of the echo type. In terms of harvesting and insulating, the iceberg should be accessible and free floating and not in an ice-locked or otherwise difficult position, so as not to incur the considerable costs and dangers in extraction. In terms of utilization, the iceberg should be massive enough within the above parameters so that the most cost-effective and greatest amount of water is provided at its final destination. The above parameters also serve to allow successful application of the following steps.

Figure 1:
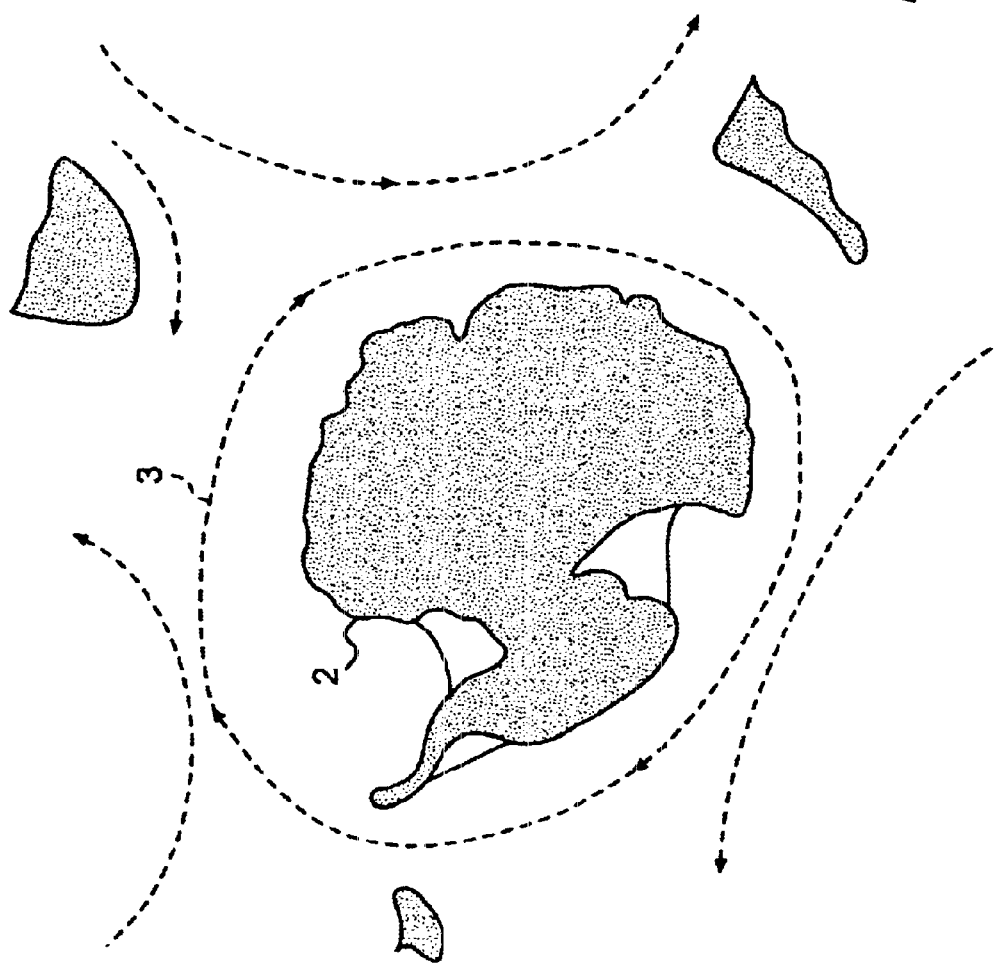
FIG. 1 is a pictorial map of Antarctica and environs, centered about the South Pole, and showing a geographical area that spawns tabular icebergs useful for the method of the present invention.

Referring to FIG. 1, which shows a pictorial map of Antarctica 2 and environs, some ice shelves 2A are located on the land mass Antarctica 2. These ice shelves 2A produce the greatest number of tabular icebergs in the world by a process known as calving. Once produced, many of these tabular icebergs, some in excess of 50 km across, find their way into West Wind Drift Current 3. Here is where the selection process, a first step, takes place. By contrast, the Northern Hemisphere produces far fewer icebergs in general and even fewer which are tabular. Furthermore, these are more likely to be ice-locked or located in inaccessible spots and exposed to unfavorable sea currents. Therefore, while not entirely ruled out, the Northern Hemisphere is not seen as a supplier of useable icebergs.

For the purposes of this embodiment the preferred iceberg will measure 1 mile long by ½ mile wide by 500 feet deep or thereabouts. It can readily be seen that this approaches the ideal shape and size of the iceberg described in the guidelines above. The iceberg can be identified, tagged, and tracked using aircraft, satellites, or other available means. Its total depth may be determined by sounding or estimated by multiplying the iceberg's freeboard dimension by a factor of 6 to 8. Its structural integrity can be determined by echo sounding, visual inspection, or other such means. Once selected, it remains now to harvest the iceberg together with other selected icebergs in preparation for the insulation process. This harvesting operation will depend upon the exact location of the selected icebergs, their intended destination, and the feasibility of moving them closer to each other and into waters which will offer the best conditions for the actual iceberg insulation operation to take place.

Insulating the selected and harvested iceberg, a second step, includes three distinct enterprises, namely, the production of the thermally insulating material, its transport to the iceberg, and the actual attachment of the insulation to the iceberg. Whereas kelp is not known to have ever been used previously as a thermal insulation, winter ice under washed up piles of kelp lasts long after other ice has melted. Referring to FIG. 2A, which depicts the production of the insulating material, a sea bed 39 is chosen in an appropriate offshore site. This site should offer the optimum conditions for growing kelp 34, such as the depth of the sea below the ocean surface 10, the soil, the current conditions, and the salinity. Also, the site should be of sufficient size to accommodate the final product and be located as close to the harvested icebergs as possible. The South Sea sands are seen as one good location. Sea bed 39 is then prepared by clearing and grading as in any agricultural project. The proper term here is mariculture. Next a grid of permanent anchors 37 is provided, along with plants of kelp 34, a mat net 38, and tie ropes 33. Anchors 37 are set into the sea bed 39 with sufficient strength and weight and spacing to withstand the floating load of the mat net 38, the wave action, the wind stresses on the fully grown kelp 34, and any currents which may occur. The anchors 37 are here shown to be concrete, but any material and design suitable for the particular conditions may be substituted. Mat net 38 is made from floating rope preferably consisting of various natural fibers are expensive and readily available such as coconut. This and other rope fibers will be grown and produced on the nearby islands in low tech mills, thus spawning new local industries, which may employ thousands including those tending kelp 34. At regular intervals within mat net 38, heavier, stronger ropes will be spaced as determined by testing and experience. Hemp may be a good choice. By way of example, every fifth rope might be a heavier rope and every hundredth rope might be an even heavier rope.

Next, kelp 34 would be planted within the grid of anchors 37. The mat net 38 is then floated into position above the anchors 37. Tie ropes 33 are then used to restrain the mat net 38 at an appropriate distance above the sea bed for the type of kelp 34 planted. As an example, the total depth from the ocean surface 10 to the sea bed 39 for a particular species of kelp 34 might be determined to be 30 feet. While in the same example, the mat net 38 might be adjusted to float 10 feet above the sea bed 39, so that it can come into contact with the self-supporting plants of kelp 34. In time, the kelp 34 will grow and cling to the mat net 38, thus becoming densely intertwined. All that remains is the cutting of the kelp 34 and the removal of the tie ropes 33, which initially may be done by local divers and eventually accomplished with specialized machinery.

Note that characteristics of local kelp varieties have been studied for their applicability to this process, but sea grasses and other seaweeds may be better or add strength and improved handling characteristics to a mat combining several types of seaweed. It should also be noted that over time the selection of seaweed species will become a science in itself Improvements in and cross breeding of kelp 34 will eventually lead to faster growing, stronger, more durable varieties. Also envisaged are seaweeds or kelps which may be developed to grow vertically but link horizontally like grape and ivy vines thus replacing the floating ropes of net 38 and others which may grow horizontally so as to bind themselves together in lily-like fashion. This would represent a tremendous future cost savings.

Figure 2:
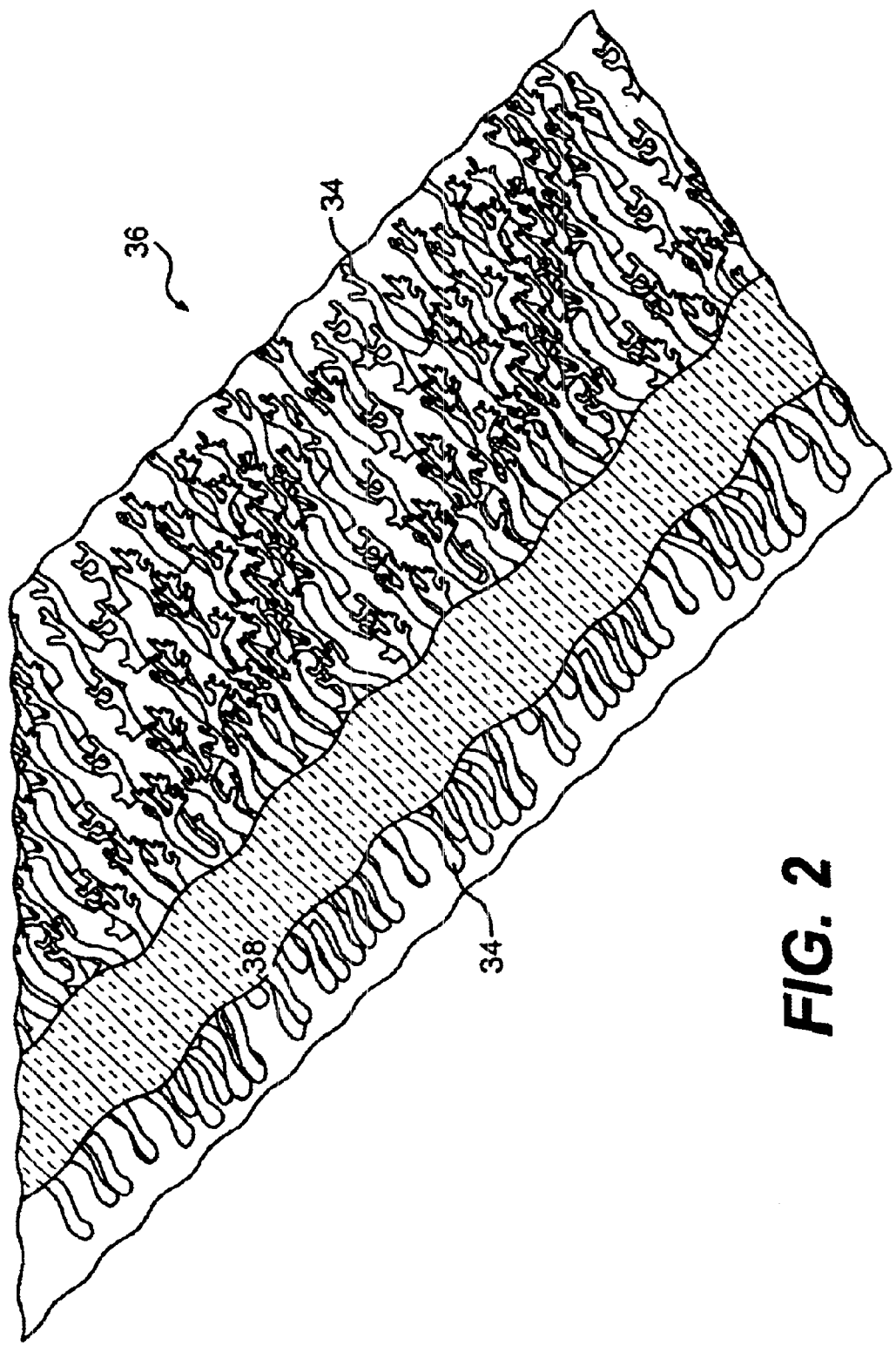
FIG. 2 shows a cutaway detail for the substructure of the produced kelp blanket.
Figure 2A:
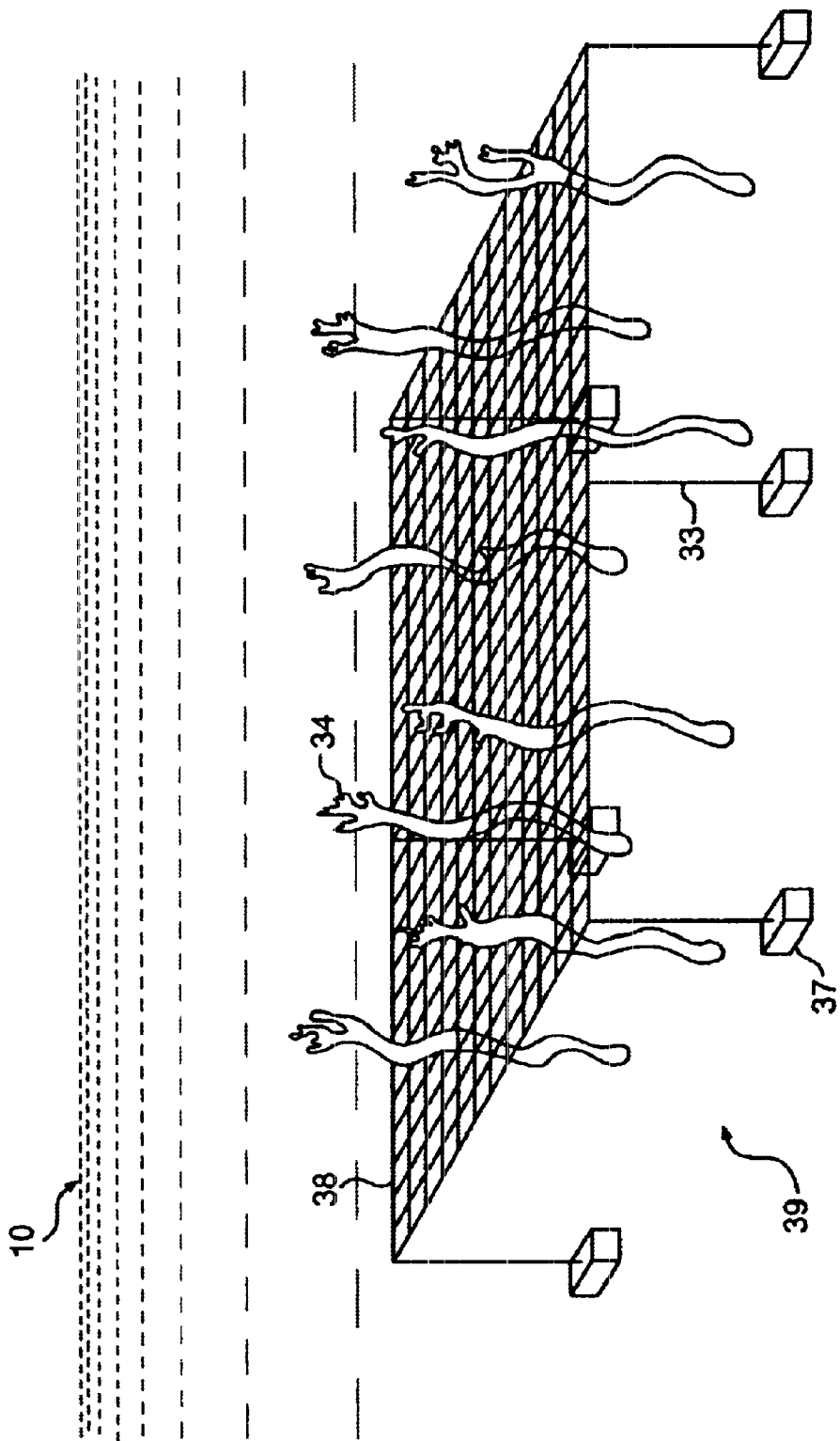
FIG. 2A shows a detail of features involved in growing kelp in the form of a blanket.

Referring to FIG. 2, which shows a cutaway detail for the substructure of the produced kelp blanket 36, the strength and density of a completed kelp blanket 36 is readily apparent. Kelp 34 has thoroughly grown around the mat net 38 thus producing a strong, effective, totally natural and biodegradable insulation barrier. Moreover, it will have been produced almost entirely at sea using only local materials and resources.

The completed kelp blanket 36, along with many others, is now ready to be transported to the harvested icebergs. A main tow cable 20, shown in FIG. 3, composed of stainless steel, synthetic fibers such as Kevlar, or some other appropriate material is provided. It must be capable of towing a kelp blanket 36, which measures in the thousands of square feet. Once the kelp blanket 36 is fully grown, the tow cable 20 is towed into position and attached to the kelp blanket 36 in a manner which maintains the integrity of the kelp blanket 36. One method would use secondary cables or chains which on one side are attached to the tow cable 20 with standard connectors, and on the other attached to the heaviest ropes in the mat net 38.

Figure 3:
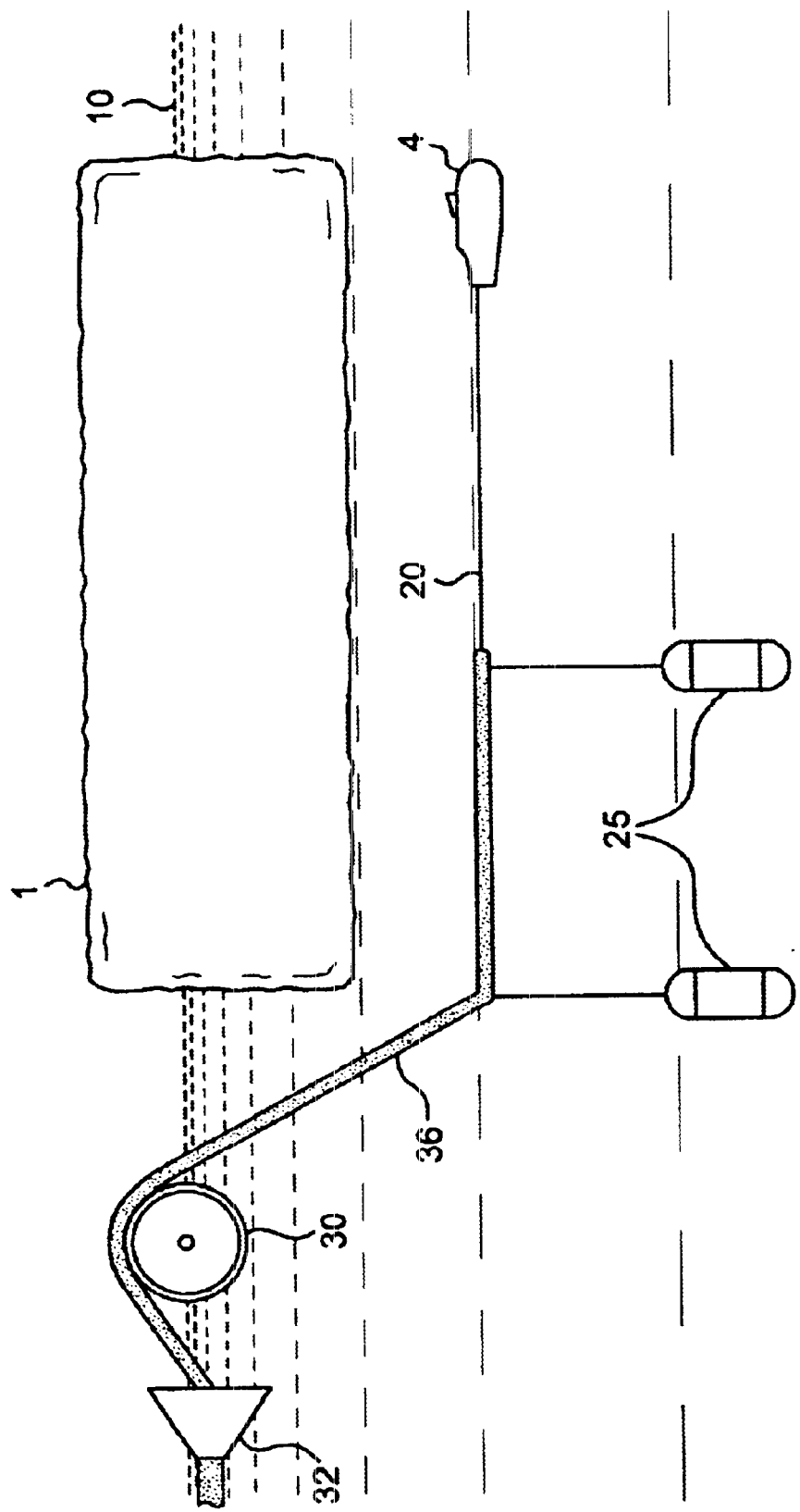
FIG. 3 pictorially shows outlines of a process for insulating an iceberg with a kelp blanket.
Figure 3C:
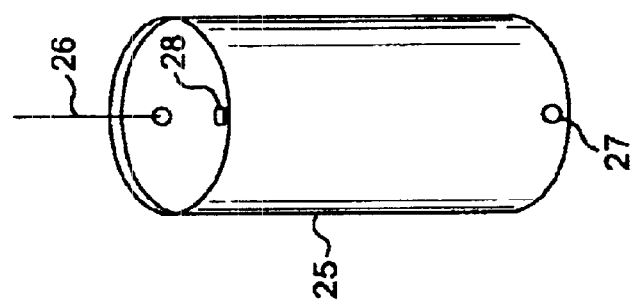
FIG. 3C denotes a configuration for a salt tank.
Figure 3B:
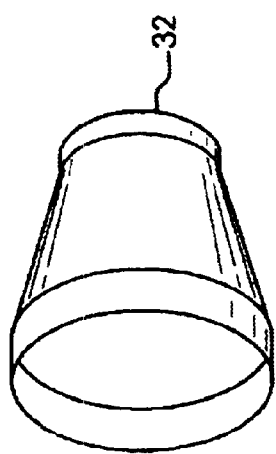
FIG. 3B pictorially shows a transportation nosecone for the blankets.

A funnel-shaped transportation nose cone 32, depicted in FIG. 3B, is provided close to the kelp blanket 36 growing areas and anchored there. The nose cone 32 is designed to allow for the convenient loading of many kelp blankets 36. The nose cone 32 is also designed to store the kelp blankets 36 for transport in a manner that allows the kelp blankets 36 to come into contact with the ocean water at all times, so that the kelp blankets 36 may remain cool, fresh, and strong. Tug boats will tow each kelp blanket 36 to the nose cone 32, where the kelp blankets 36 will be packed tightly so as to allow for the maximum number of kelp blankets 36. The tow cables 20 will be passed through the large end to the small end of the nose cone 32 and attached to a tug boat, which in turn will tow the filled nose cone 32 to a large towing vessel. This vessel will then be able to tow a large flotilla of nose cones 32 filled with kelp blankets 36 to the harvested icebergs in the Antarctic.

It should be pointed out that the nose cone 32 may have many different shapes and configurations. The nose cone 32 may still be funnel-shaped but instead of a round cross-section as depicted in FIG. 3 it may have a rectangular cross-section if this is found in practice to be a more effective design perhaps due to variable weather and sea states. Also, the nose cone 36 might contain a built-in or attached bollard to draw in kelp blankets 36 and also might contain other specialized equipment and features to ensure that on-loading, storage, and off-loading of kelp blankets 36 is as quick and efficient as possible. This will only become known after much study and experience in the field.

Figure 3A:
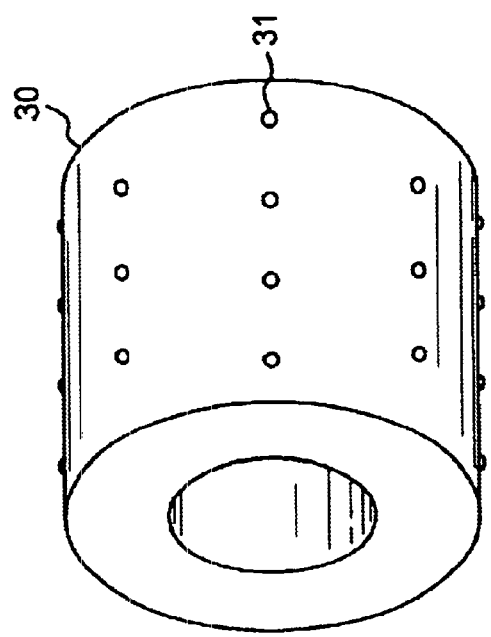
FIG. 3A depicts a spool for spreading out a kelp blanket.
Figure 4:
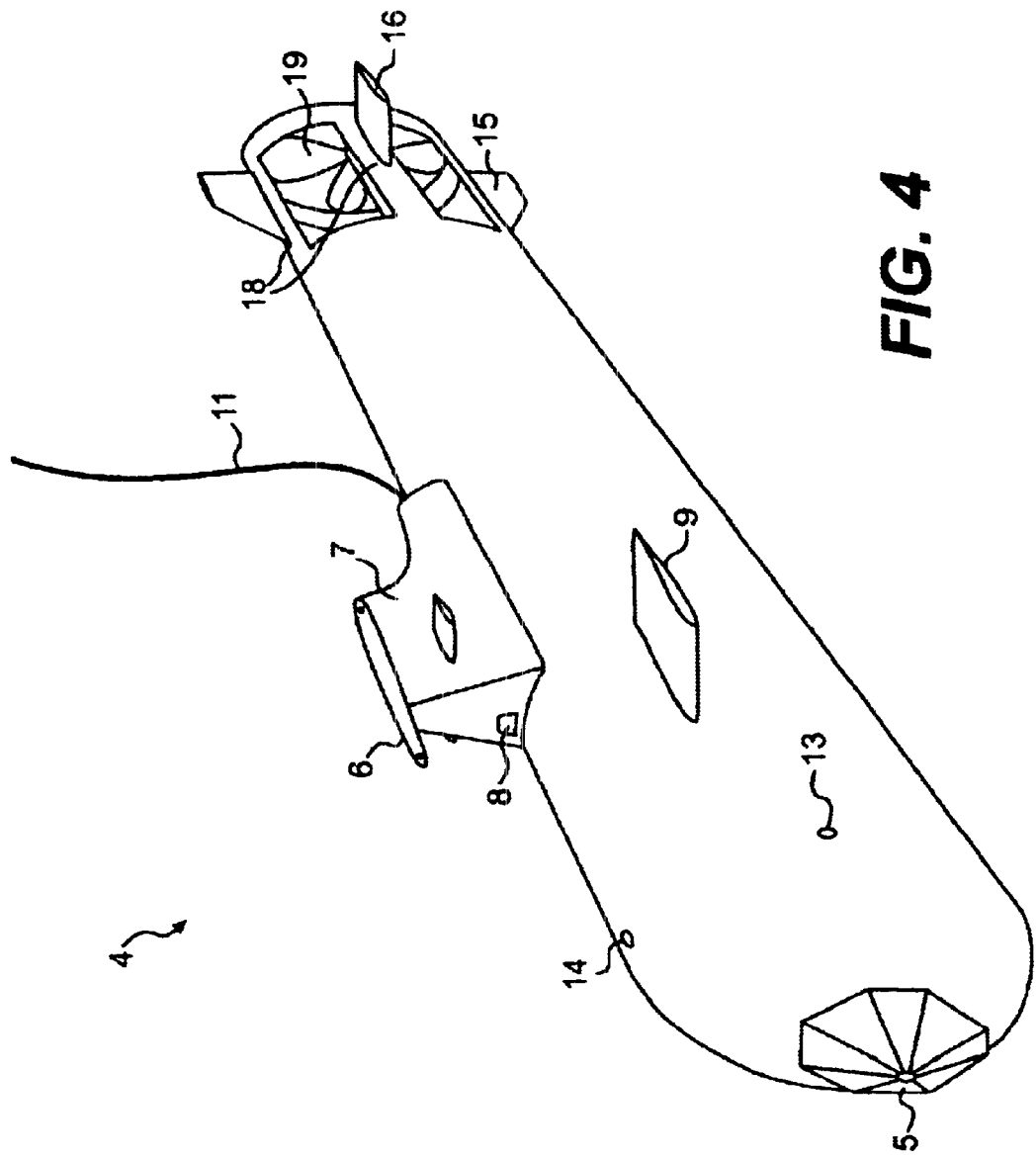
FIG. 4 is a pictorial of a subtug indicating details of improved features.

Upon the arrival of the nose cones 32 filled with a maximum amount of kelp blankets 36 at the harvested icebergs, the actual insulation operation can commence. A spool 30, as depicted in FIG. 3A, is provided for spreading out a newly transported kelp blanket 36. To facilitate this procedure a series of hemispheres 31 are arranged on the outside circumference of the spool 30. Also provided are salt tanks 25, depicted in FIG. 3C, having a support cable 26 and a tank inlet 28 at its top end, and a tank outlet 27 at its bottom end. Also provided is a subtug 4, which is depicted in FIG. 4, and which will be described in detail in the transportation operation section below. Note that other types of submersible craft could be used in place of the preferred subtug 4.

Referring now to FIG. 3, which shows the outlines of a process for insulating a harvested iceberg 1 with a kelp blanket 36, the operation is carried out as follows. After transportation the nose cone 32, which contains kelp blankets 36, has been towed to a point near harvested iceberg 1, the nose cone 32 is anchored by conventional means. At some distance between the nose cone 32 and the iceberg 1, the spool 30 is paced so that it floats upon the ocean surface 10. The tow cable 20 is attached on one end to a kelp blanket 36 and on the other end to the subtug 4 with a spool 30 in between so that the tow cable 20 is resting on the outside circumference of the spool 30. Subtug 4, moving along on the ocean surface 10, now pulls the tow cable 20 directly over the spool 30. As the kelp blanket 36 comes into contact with the outside circumference of the spool 30, hemispheres 31 on the surface of the spool 30 generate vectored forces resultant from the weight of the kelp blanket 36 and towing forces. As the spool 30 begins to turn as the kelp blanket 36 is pulled over the spool 30, the vectored forces from hemispheres 31 cause the kelp blanket 36 to spread and straighten out by the time the kelp blanket 36 has finished rolling over the spool 30. Salt tanks 25, contain the correct amount of salt to float a kelp blanket 36 a predetermined distance below an iceberg 1, are attached at regular intervals along the bottom of the kelp blanket 36 using support cables 26. A subtug 4 now pulls a submerged kelp blanket 36 along the underside of the iceberg 1 and then re-surfaces. Salt in the salt tanks 25 can then be emptied through a tank outlet 27 by remote control or by other means thus allowing the kelp blanket 36, which is naturally boyant, to float up to the underside of iceberg 1. At this point the salt tanks 25 and the support cables 26 can be removed from the kelp blanket 36 to be used again.

To complete the insulation operation it now remains to secure the kelp blankets 36 to the underside and sides of the iceberg 1. This can be accomplished in a number of ways but preferably by using the tow cable 20 and other cables of sufficient size and length to wrap around the iceberg 1 and secure back to another edge of the kelp blanket 36. If the iceberg 1 encounters large ocean swells en route that could cause splits along a fault line, the securing cables will hold it together. Other less desirable methods might include the use of huge staple-like devices which are embedded deep into the iceberg 1 and frozen in place. It is especially important that iceberg 1 be protected from wave action that can sometimes range as high as one hundred feet from crest to trough during heavy seas. This can be accomplished by adding extra layers of kelp blankets 36 to an area fifty feet above and fifty feet below the water line completely around the iceberg 1.

Figure 4A:
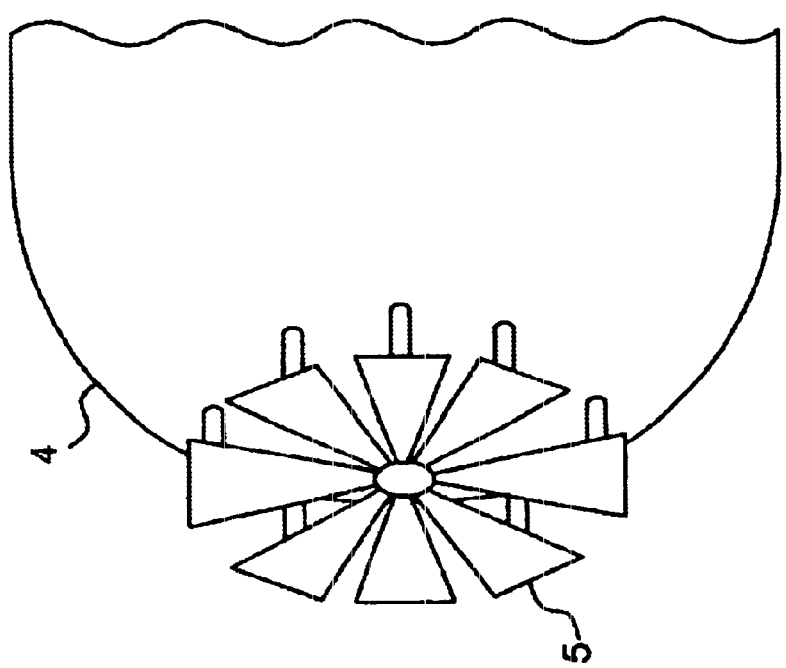
FIG. 4A is a section detail of propulsion features.
Figure 5:
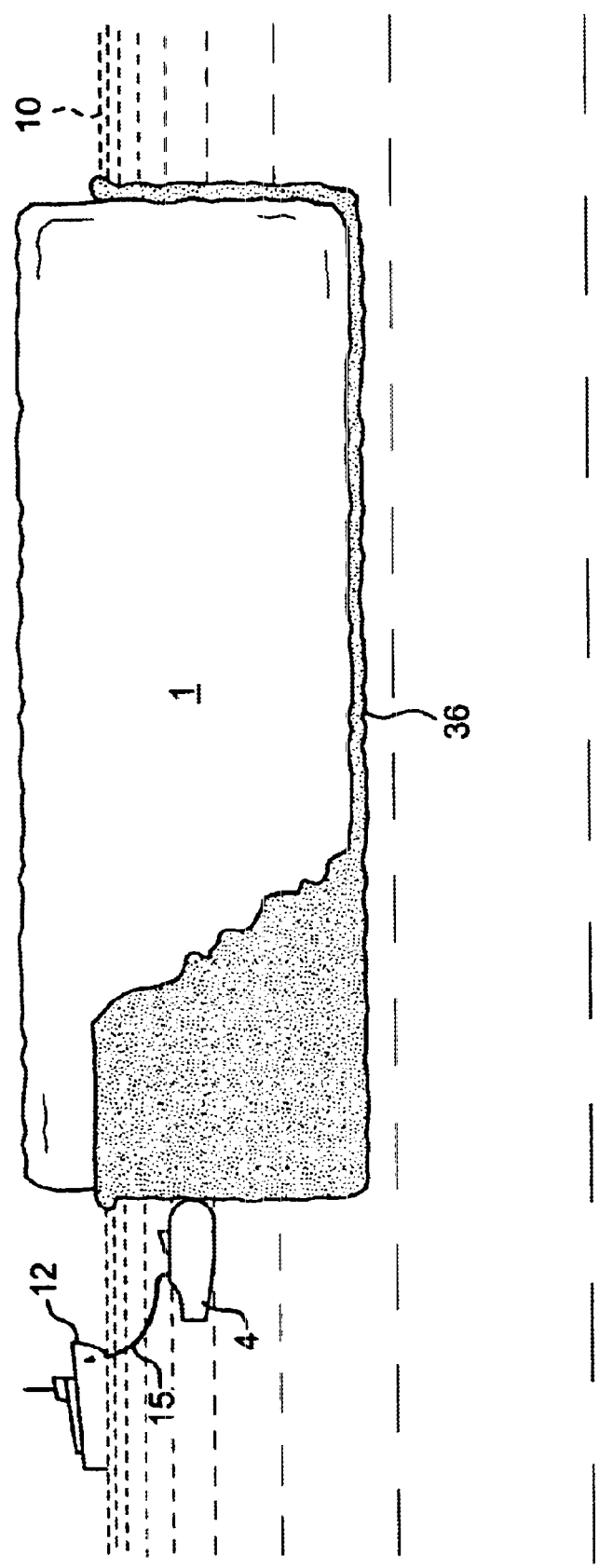
FIG. 5 depicts an iceberg underway with the kelp blanket cut away.

The next major operation involves the transportation of the insulated iceberg 1 to its utilization destination, the third step. Referring to FIG. 4, a subtug 4 is provided with a set of retractable pusher plates 5 which are made of suitable material and are large enough to reduce the pressure per area below a value that would melt the ice. Also provided are a tether connection 11, an ice-resistant propeller 19, a rudder 15, a stern plane 16, a kort nozzle 17, an ice protector 18, horizontal thruster ports 13, vertical thruster ports 14, a bridge 7, a bridge window 8, a bow plane 9, and a clearing cable 10 which are all individually of conventional design but are unique in their combination. Referring to FIG. 4A, the subtug 4 is also provided with hydraulic rams 6. A subtug 4 will measure approximately 225 to 250 feet in length, 35 feet in diameter, and have a displacement on the order of 6000 to 8000 tons. A subtug 4 would be designed for a normal operating depth of 1000 feet and an emergency depth of 1500 feet. A subtug 4 is propelled by an electric motor propulsion system which will provide maximum of 45,000 shaft horsepower. A supply ship 12, as shown in FIG. 5, supplies the electric power to the subtug 4 by way of a tether 11. For surface and other operations besides iceberg propulsion, which do not require so much power, a subtug 4 is also capable of independent operation and auxiliary power from a diesel generator with a capacity of approximately 1800 HP. A subtug 4 is further capable of manned and unmanned operation. It is thought that during the long, slow transport of an iceberg 1, the sub 4 will be unmanned, and operated from supply ship by control and signal transmission through the tether 11. Further, in the event of damage or breakage to the tether 11 during unmanned operation, a subtug 4 would be safely re-surfaced using an onboard battery and back-up sonar and radio signal reception and transmission with the supply ship 12. Note that a subtug 4 may have many other uses besides propelling an iceberg 1, such as moving and harvesting selected icebergs 1, towing kelp blankets 36 under an iceberg 1 during the insulation operation, and cutting off projections that might prevent an iceberg 1 from entering a channel 49 or might interfere with proper operation of the pawls 100 as described below. Naturally, a subtug 4 would be fitted out with the equipment necessary to perform these tasks.

Once an iceberg 1 has been thoroughly insulated and inspected, it is ready to be transported to its ultimate destination. A subtug 4, attached to a supply ship 12 is made ready for unmanned operation. Personnel on the supply ship 12 steer the subtug 4 by means of a TV camera, forward lights, and laser ranging which are all located behind and protected by a window 8. Before making contact with the iceberg 1, the subtug 4 must first activate pusher plates 5. This is accomplished by means of hydraulic rams 6, which move the pusher plates 5 out from the hull of the subtug 4 so that the pusher plates 5 can make full contact while achieving maximum surface area, which in the present design is approximately 1,230 square feet. It has been calculated using the shaft horsepower, propeller efficiency, speed, and total thrust force of a subtug 4 that the contact load on the kelp blanket 36 and the ice is about 70 pounds per square inch. This has been found to be a reasonable value for the compressive strength of a kelp blanket 36 and ice.

Referring now to FIG. 5, which depicts an iceberg 1 en route with the kelp blanket 36 insulation cut away, the method of transport is readily apparent. Pusher plates 5 of a subtug 4 make contact in the middle of one of the shorter sides of the iceberg 1 at or near a line projected through the center of gravity of the iceberg 1. To reduce the effects of splitting, spalling, and ablation, a subtug 4 is designed to move at only 1 knot. However, this presents a challenge: Bow plane 9 and stern plane 16, shown in FIG. 4, are not effective for fine depth control at speeds below 3 knots. The horizontal thruster ports 13 and vertical thruster ports 14 are added to be very effective down to zero forward speed.

To gain effective direction control for an iceberg 1 during transit through various ocean currents, wind forces, Coriolis effects, and any other forces acting on the iceberg 1 which might effect navigation, a minimum of two tugboats, not shown, would be spaced equidistantly from the longitudinal centerline of an iceberg 1. These could be attached to an iceberg 1 in any number of ways and provide direction or course control by varying the thrust from one or the other tugboat to provide the turning forces required.

This arrangement produces a very effective, efficient, and stable manner of propulsion. It eliminates the drastic consequences of the reverse wake effect which would occur from the rear of any vessels pulling an iceberg 1. Furthermore, a subtug 4 is not rigidly attached to an iceberg 1. This means that as the iceberg 1 inevitably partially melts or possibly splits causing its center of gravity to shift, the subtug 4 can readily be re-positioned in line with the new center of gravity so that minimal loss of propulsion efficiency or floating stability will occur. Onboard electronics may also be used to detect, calculate, and reposition a subtug 4 as needed for optimum placement and power output effectiveness.

The last major operations of the process involve receiving the iceberg 1 into an adequately large area, depleting the colossal momentum of the iceberg 1, and finally, storing the iceberg 1 while its melt water and cooling benefits are utilized in the arid region of its final destination.

A suitable destination site must be chosen. It must be in or lie adjacent to the sea Its topography must be flat and near sea level for several miles in all directions. It must be located where pumping the fresh melt water to the arid geographical area is economically advantageous, and access roads for the prodigious amount of personnel and equipment necessary for the project must be possible.

Figure 6:
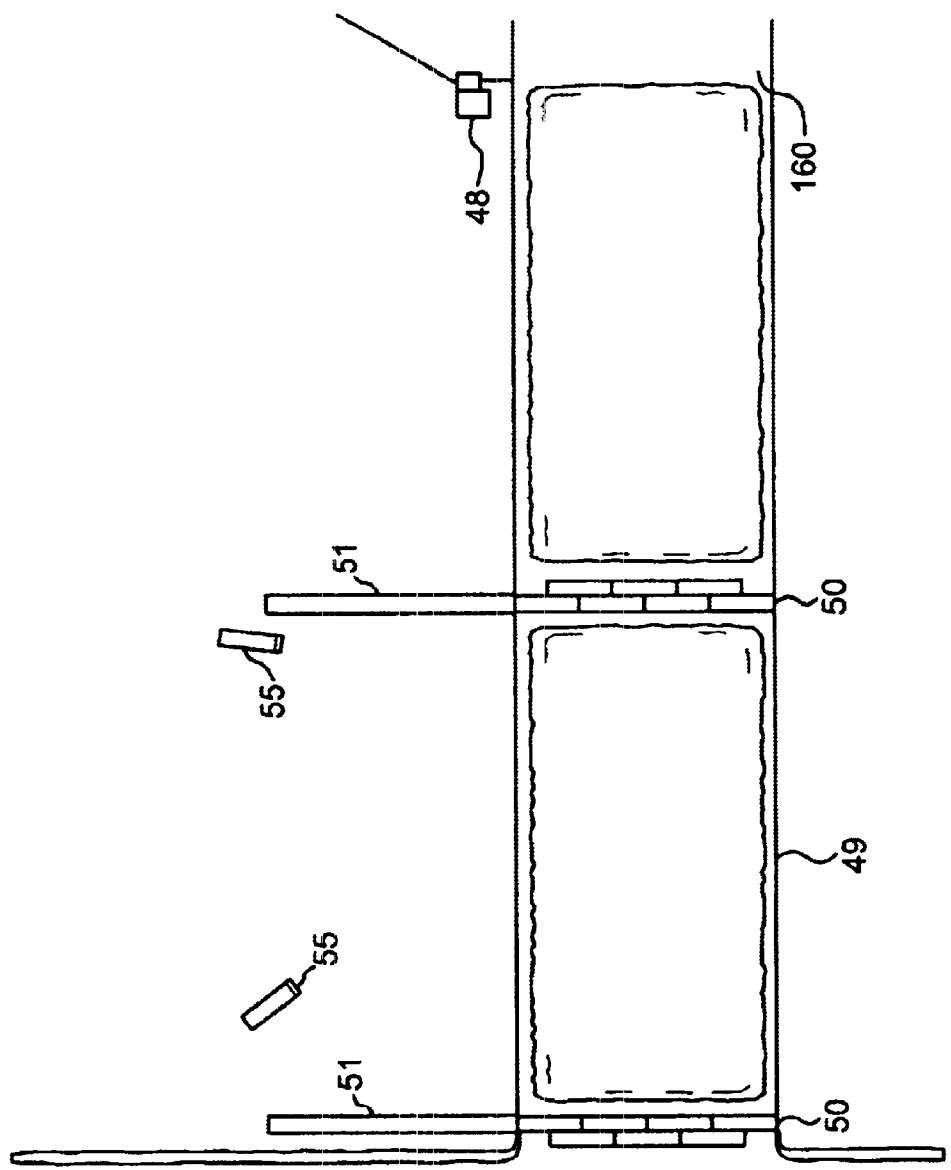
FIG. 6 depicts a top view layout of a channel for receiving icebergs and for capturing waters between rolldams.

Referring to FIG. 6, which is a top view layout of the first two miles in from the sea, the major features of the project can be seen. A channel 49 is provided by excavation which measures, at its mouth to the sea, approximately 2600 feet wide by 500 feet deep. Its length inland is approximately 5 miles. Its length and width may vary somewhat, but the depth dimension must be maintained to its terminus, not shown. The bottom will be down to bedrock whose significance will be seen below. The reason for these dimensions is apparent; the channel 49 must be big enough to receive an iceberg 1, which measures about 1 mile in length, 112 mile in width, and 500 feet in depth, and long enough to store the several icebergs 1 which the present invention calls for. Also seen are two unique movable dams called rolldams 50, one placed at the mouth of channel 49 and another placed approximately 1 mile inland. Also provided are disc ramps 51 in conjunction with each rolldam 50, two spare discs 55, which are resting on a flat berm 162, which is above sea level, and a fresh melt water distribution station 48, which is built on a berm 162.

In this embodiment, rolldam 50 comprises seven discs 55. Each disc 55 is composed of steel or the like and measures approximately 650 feet in diameter by 65 feet 600 thick. The configuration for the discs 55 in a rolldam 50 are as follows: One row is composed of four discs 55 standing on edge and aligned in a single plane aligned with their circumferences touching adjacent discs. A second row is composed of three discs 55 standing on end and aligned in the same manner. The two rows stand with a plane surface of one row of discs abutting a plane surface of the other row of discs so that the longitudinal center of each row is aligned one with the other. Thus the rolldam is wide enough and high enough to fully cover the opening of a channel 49 and has minimal gaps when locked in place as described below.

Figure 7:
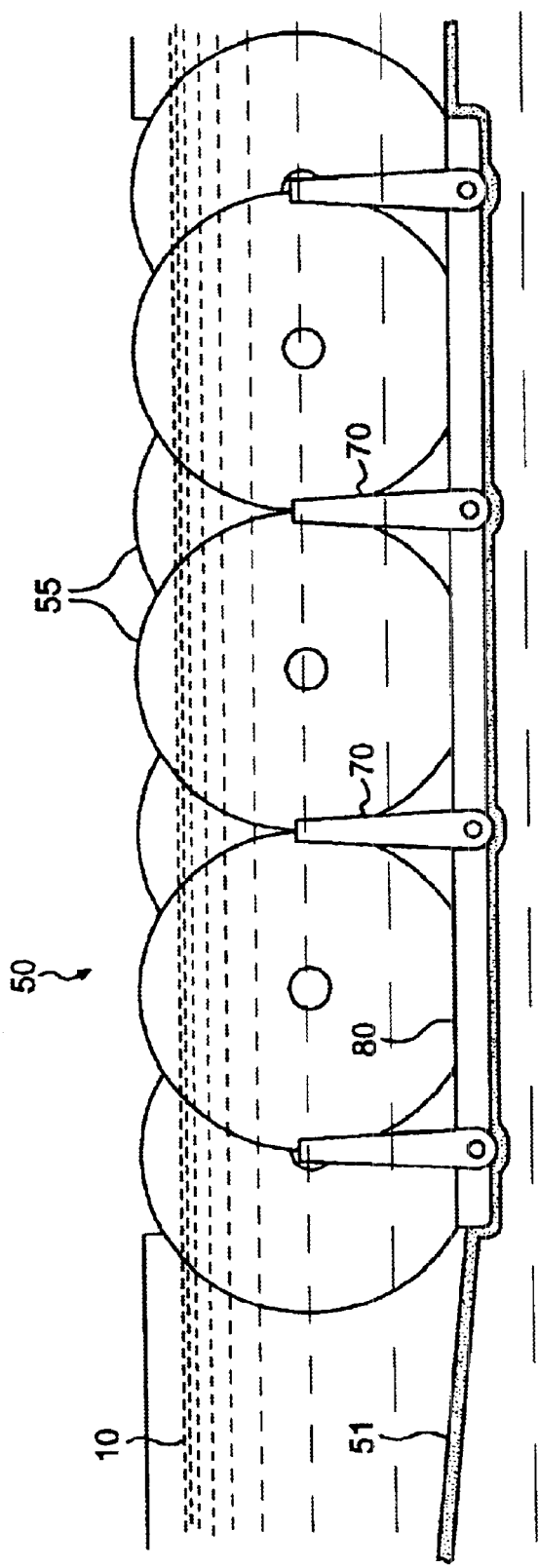
FIG. 7 shows a detail of a rolldam.
Figure 7A:
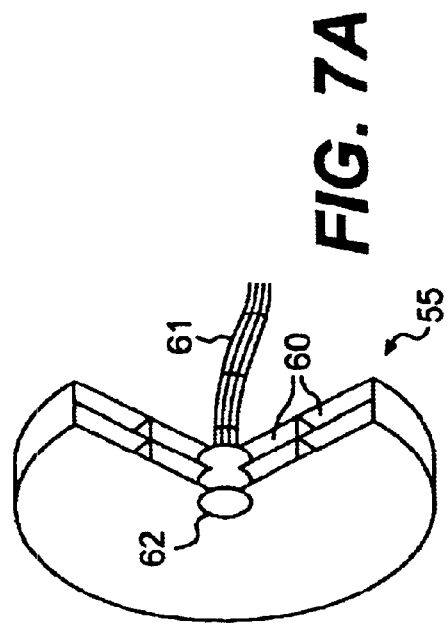
FIG. 7A shows a detail for a rolldam disc section.
Figure 8:
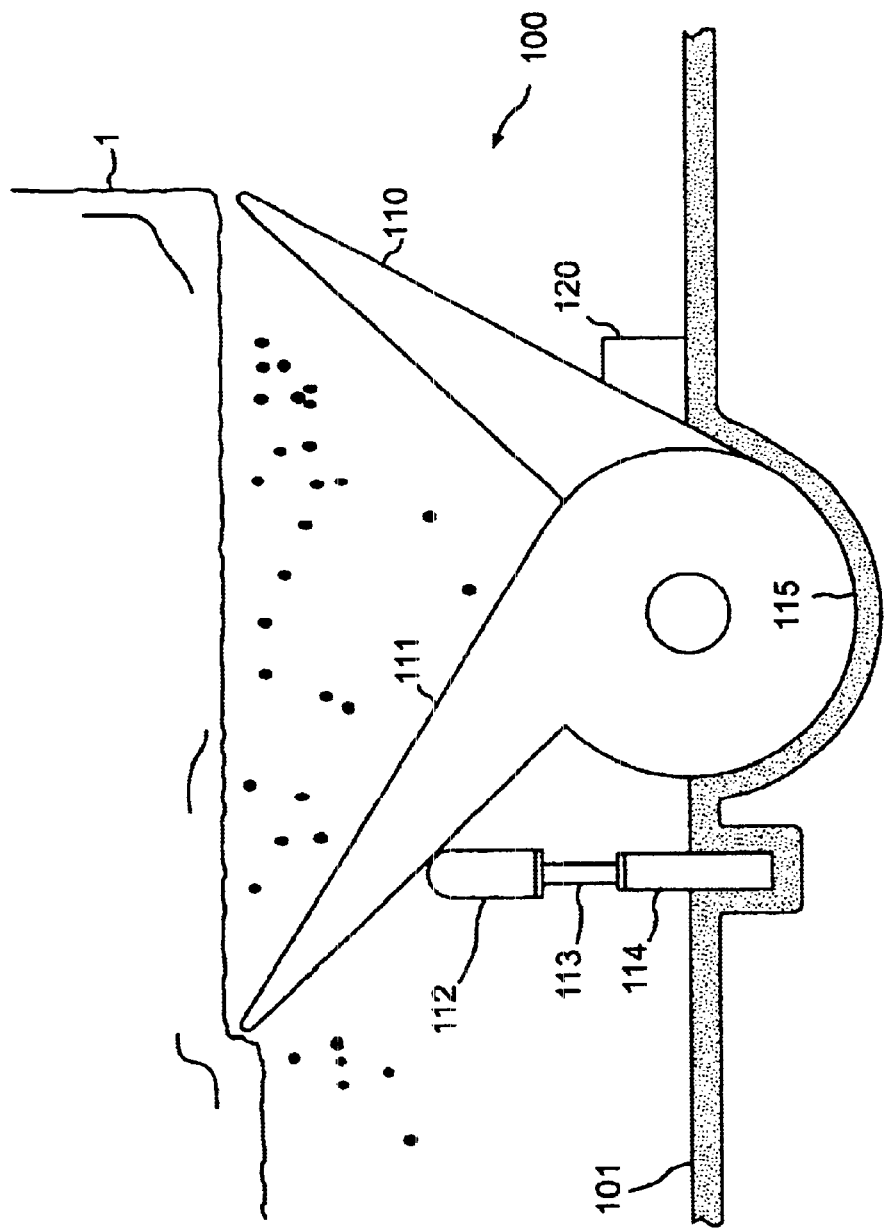
FIG. 8 depicts the action of a pawl stopping an iceberg within a channel.
Figure 8A:
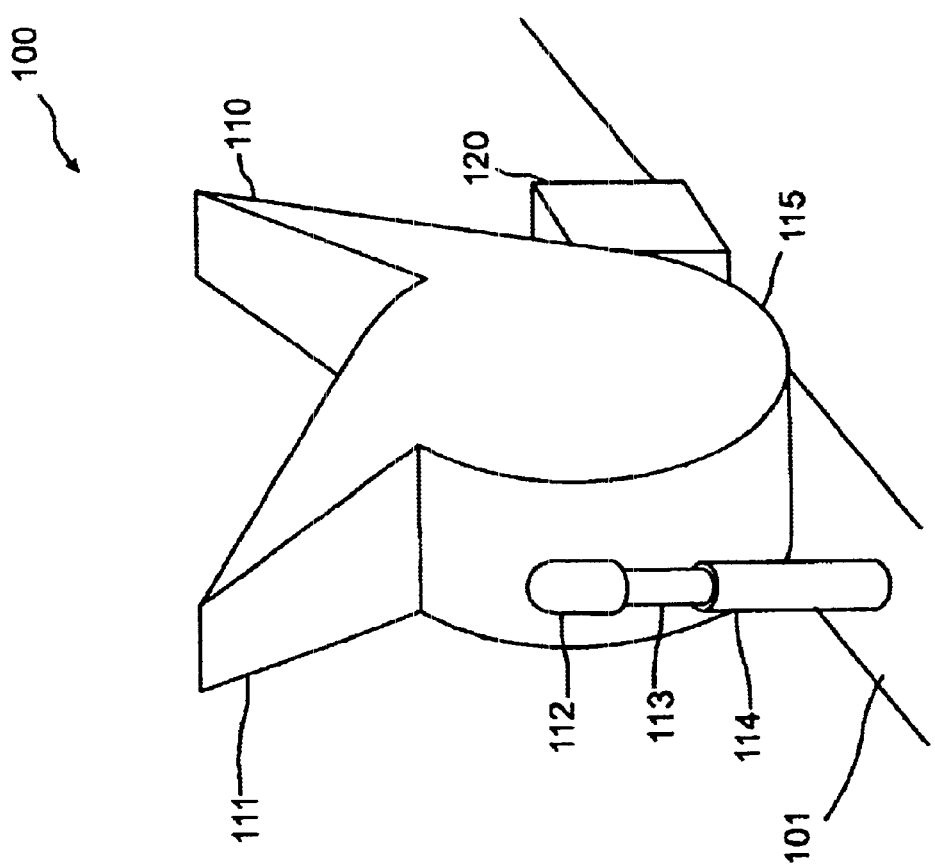
FIG. 8A is a perspective view of a pawl.

Referring now to FIG. 7, which shows the details of a rolldam 50, a dam truck 80, and buttresses 70 are additionally provided. Referring now to FIG. 7A, which shows details of a disc section, the disc tanks 60, a disc center 62, and hoses 61 are also additionally provided. Referring now to FIG. 8, which depicts how iceberg 1 is stopped within channel 49, a pawl 100, a pawl long arm 111, a cap 112, a rod 113, a body 114, a pawl short arm 110, a pawl seat 120, a base depression 115, and a channel bottom 101 are further additionally provided.

The reception of iceberg 1 proceeds as follows. As iceberg 1 approaches channel 49 from the sea, rolldam 50 on the seaward side is rolled up ramp 51 and onto berm 162, as is rolldam 50 on the landward side. Rolldams 50 are able to be rolled in a slow but effective process because of the internal configuration of its discs 55. Referring to FIG. 7A, it can be seen that disc 55 contains internal disc tanks 60. Disc tanks 60 are arranged radially out from disc center 62 in arcs measuring 5 degrees for a total of 72 wedge shaped tanks. Hoses 61, which contain air, water, and electric lines, are attached to disc center 62, which contains an internal away of valves, pumps, and pipes, by means of an annulus, which allows hoses to remain static while the remaining parts of disc 55 are turning. To roll a single disc 55, an operating control signal from an operation station, not shown, directs water or air to be pumped sequentially into a particular disc tank 60. By pumping either water to displace air, or air to displace water, in any particular disc tank 60, the center of gravity of a disc 55 is changed creating a rolling torque for moving the discs so that a disc 55 is made to roll in the direction desired. An entire rolldam 50 can be made to roll up ramp 51, which is constructed on a slope of 5 degrees, and down ramp 51 into place, by causing its discs 55 to roll one by one.

As it enters a channel 49, the forward movement of an iceberg 1 must be brought to a halt either before it reaches the end of the channel 49, when an iceberg 1 is among the first three icebergs in the channel 49 or before it reaches the rolldam 50 on the landward side, when an iceberg 1 is among those after the first three icebergs in channel 49. This is accomplished by a series of pawls 100 which are built into bed bedrock channel bottom 101. These perform their stopping function as follows. Referring to FIG. 8, as iceberg 1 moves from left to right, the forward edge of iceberg 1 hits pawl short arm 110, which in turn causes pawl 100 to turn within base depression 115. This causes pawl long arm 111 to come into contact with the underside of iceberg 1, thus shearing off ice as the end of long arm 111 digs deeper into the underside of iceberg 100. Body 114 which pushes rod 113 and cap 112 maintains an upward pressure on the underside of long pawl arm 111 while it pushes long pawl arm 111 into its final, correctly angled stopping position, with short pawl arm 110 resting against pawl seat 120. Refer to FIG. 8B for a perspective view of pawl 100.

It can now be seen why it is so crucial that channel bottom 101 is bedrock. Even though pawl 100 is constructed from steel and concrete or the like, the actual stopping force of pawl 100 is transmitted longitudinally through pawl long arm 111, into base depression 115, and ultimately into channel bottom 101. The exact configuration and functioning of pawls 100 and the number and placement of pawls 100 within channel 49 will require extensive research and testing as many of the strengths, forces, and characteristics of ice are still unknown to science.

When the trailing edge of iceberg 1 has cleared the mouth of channel 49, rolldam 50 on the seaward side is rolled down ramp 51 and into place. Referring to FIG. 7, one can see that rolldam 50 can be additionally strengthened by the use of buttresses 70. Buttresses 70 are made from steel and concrete or the like and are built into channel bottom 101. They are designed to lay down flat within channel 49 when rolldam 50 is not in place. After rolldam 50 is rolled into place, buttresses 70, which may be placed on both sides of rolldam 50, are swung upwards into position to rest against rolldam 50. To further strengthen and add integrity to rolldam 50, movable blocks, not shown, might be employed. These would be placed on the outside edges of rolldam 50, thus locking discs 55 together by preventing them from any further rolling.

The storing operation proceeds as follows. With rolldam 50 on the seaward side in place, iceberg 1, which is the first iceberg in channel 49, is completely isolated within the landward end of channel 49. Kelp blankets 36 may now be removed. Note that all organic components of the insulation can be used as fertilizer in the newly flourishing fields of the region, while tow cables 20 and other such components can be used over again. Next, one at a time, two more icebergs 1 are brought into channel 49 and stopped just in front of first iceberg 1 where their kelp blankets 36 are removed. At this point landward rolldam 50 is rolled down into place within channel 49. Thus the first three icebergs 1 are isolated within the landward end of channel 49. While the three icebergs 1 melt, some fresh melt water 160 will float above any ocean salt water 161 within the landward end of channel 49 and some will dilute it.

Fourth iceberg 1 and all succeeding icebergs 1 are now stored as follows. Fourth iceberg 1 is brought into channel 49 and stopped before it reaches landward rolldam 50. Seaward rolldam 50 is now rolled into place at the mouth of channel 49, thus isolating fourth iceberg 1 in the seaward end of channel 49, that is, between seaward rolldam 50 and landward rolldam 50. Kelp blankets 36 are then removed from fourth iceberg 1. As much ocean salt water 161 as possible is pumped out of the seaward end of channel 49. Next, landward rolldam 50 is very slowly rolled up ramp 51 so as to allow the mixture of fresh melt water 160 and diluted ocean salt water 161 from the landward end of channel 49 to gradually flow into the seaward end of channel 49, thus re-floating fourth iceberg 1. At this stage, landward side rolldam 50 is completely rolled up ramp 51 out of channel 49, and fourth iceberg 1 can now be pushed by subtug 4, or by some other means, into the landward end of channel 49 and stopped just in front of the third iceberg 1. By this method, at least four icebergs 1 can always be stored in the landward end of channel 49. As the earliest iceberg 1 to arrive melts completely away in the hot, arid climate, a new iceberg 1 will then replace it. Thus, at a certain point, the landward end of channel 49 will contain a vast quantity of fresh melt water 160 with only a minute percentage of ocean salt water 161. Moreover, since ocean salt water 161 is heavier than fresh melt water 160 it will remain at the bottom of channel 49.

Fresh melt water 160 is now pumped from highly place intakes, not shown, in the landward end of channel 49 to distribution station 48, which distributes fresh water 160 through pipes to areas as dictated by the needs of the region. Note also that since several icebergs 1 are stored at the same time in channel 49, the weather patterns and climate of the entire region are sure to be beneficially affected. Exactly what form these additional benefits will take only the future holds.

From the preceding description of the preferred embodiment, it is evident that the objects of this invention are attained. The process of moving fresh water in the form of icebergs 1 from the Antarctic 2 to arid geographic regions around the world vitally in need of water is shown to be not only possible, but economically and environmentally beneficial as well. Selected and harvested icebergs are effectively insulated with and protected by readily grown and recyclable resources which never need be lifted or taken from the water. The icebergs 1 are propelled and navigated in a safe, stable, and efficient manner which will deliver the iceberg 1 to its final destination with the least amount of spalling, splitting, or other ablation. This is accomplished by a unique and powerful subtug 4, which can be easily repositioned to push safely on the optimal spot on iceberg 1 which is constantly changing. Iceberg 1 is stopped at its final destination by a series of specially designed pawls 100 which transfer the tremendous momentum of iceberg 1 to the bedrock at the bottom of receiving channel 49.

Lastly, iceberg 1, together with its melt water 160, is stored and utilized along with several other icebergs 1 in the landward end of channel 49. At the seaward end of channel 49 are two massive, movable, rolling dams, called rolldams 50, which are used to isolate incoming iceberg 1 from the sea and saltwater and to protect stored icebergs 1 and its fresh melt water 160 from wave action and brackish contamination.

While the above description contains many specificities, these should not be construed as limitations on the scope of the invention, but rather as an exemplification of one preferred embodiment thereof. Many other variations are possible, some of which have already been pointed out above. Accordingly, the scope of the invention should be determined not by the embodiment illustrated, but by the appended claims and their legal equivalent.

I claim:

1. An improved method for the process of utilizing icebergs for supplying fresh water to arid geographical areas comprising the steps of selecting an iceberg, insulating the iceberg, moving the iceberg to its destination, and capturing melt water for distribution wherein improvements comprise:

selecting a tabular iceberg up to 2 kilometers in length, growing buoyant and thermally insulating mats of seaweed in a sea bed, insulating said tabular iceberg with said mats by towing said mats under said iceberg and allowing the mats to float against the bottom and sides of said iceberg, providing a propulsion device fitted with large pusher plates for contacting said iceberg, pushing said iceberg with said propulsion device such that the resultant force vector is directed through the center of gravity of the iceberg, and providing a channel for receiving said icebergs at a destination site.

2. The improved method for the process of utilizing icebergs of claim 1 wherein said buoyant and thermally insulating mats are made by growing seaweed through a buoyant rope structure in an offshore site.

3. The improved method for the process of utilizing icebergs of claim 1 wherein said seaweed comprises a combination selected from a group comprising kelps and sea grasses.

4. The improved method for the process of utilizing icebergs of claim 1 wherein said channel includes pawls designed to engage said iceberg as it starts to pass and chip off ice creating a drag force that will stop the iceberg's forward motion within the channel.

5. The improved method for the process of utilizing icebergs of claim 1 wherein said channel is fitted with moveable dams to allow opening for an entering iceberg and closing to hold melt water.

6. The improvement of claim 5 wherein said moveable dams comprise a first set of large round discs which when set on edge and rolled together in a first line with circumference edges juxtaposed span said channel, a second set of large round discs which when set on edge and rolled together in a second line parallel to said first line with circumference edges juxtaposed and face edges touching face edges of said first set and centered midway between centers of discs in said first set span said channel and make a major part of a dam, said large round discs incorporating internal tanks and pipes and pumps and controls, and said controls being operable to cause said pumps to force air or water into said tanks through said pipes to cause the center of gravity of the discs to be changed creating a rolling torque for moving the discs.

7. An improved method for the process of utilizing icebergs for supplying fresh water to arid geographical areas comprising the steps of selecting an iceberg, insulating the iceberg, moving the iceberg to its destination, and capturing melt water for distribution wherein improvements comprise:

selecting a tabular iceberg growing buoyant and thermally insulating mats of seaweed in a sea bed, insulating said tabular iceberg with said mats by towing said mats under said iceberg and allowing the mats to float against the bottom and sides of said iceberg, providing a propulsion device fitted with large pusher plates for contacting said iceberg, pushing said iceberg with said propulsion device such that the resultant force vector is directed through the center of gravity of the iceberg, and providing a channel at a destination site wherein said channel includes pawls designed to engage said iceberg as it starts to pass and chip office creating a drag force that will stop the iceberg's forward motion within the channel.

8. The improved method for the process of utilizing icebergs of claim 7 wherein said channel is fitted with moveable dams to allow opening for an entering iceberg and closing to hold melt water.

9. The improvement of claim 8 wherein said moveable dams comprise a first set of large round discs which when set on edge and rolled together in a first line with circumference edges juxtaposed span said channel, a second set of large round discs which when set on edge and rolled together in a second line parallel to said first line with circumference edges juxtaposed and face edges touching face edges of said first set and centered midway between centers of discs in said first set span said channel and make a major part of a dam, said large round discs incorporating internal tanks and pipes and pumps and controls, and said controls being operable to cause said pumps to force air or water into said tanks through said pipes to cause the center of gravity of the discs to be changed creating a rolling torque for moving the discs.

* * * * *